US010696566B2

(12) United States Patent
Lange

(10) Patent No.: US 10,696,566 B2
(45) Date of Patent: Jun. 30, 2020

(54) POWER GENERATING AND WATER PURIFYING SYSTEM

(71) Applicant: Shawn Erick Lange, Cedartown, GA (US)

(72) Inventor: Shawn Erick Lange, Cedartown, GA (US)

( * ) Notice: Subject to any disclaimer, the term of this patent is extended or adjusted under 35 U.S.C. 154(b) by 0 days.

(21) Appl. No.: 16/105,514

(22) Filed: Aug. 20, 2018

(65) Prior Publication Data

US 2019/0308888 A1    Oct. 10, 2019

Related U.S. Application Data

(60) Provisional application No. 62/653,314, filed on Apr. 5, 2018.

(51) Int. Cl.
*C02F 1/16* (2006.01)
*F01D 15/10* (2006.01)
*B01D 1/00* (2006.01)
*B01D 5/00* (2006.01)
*G21D 5/12* (2006.01)
*C02F 101/00* (2006.01)

(52) U.S. Cl.
CPC ............. *C02F 1/16* (2013.01); *B01D 1/0029* (2013.01); *B01D 1/0058* (2013.01); *B01D 5/006* (2013.01); *F01D 15/10* (2013.01); *G21D 5/12* (2013.01); *C02F 2101/006* (2013.01); *C02F 2201/009* (2013.01); *C02F 2201/32* (2013.01); *F05D 2220/31* (2013.01); *F05D 2220/76* (2013.01)

(58) Field of Classification Search
CPC ....... C02F 1/16; B01D 1/0029; B01D 1/0058; B01D 5/006; F01D 15/10; G21D 5/12
See application file for complete search history.

(56) References Cited

U.S. PATENT DOCUMENTS

| | | | | |
|---|---|---|---|---|
| 4,121,977 A | * | 10/1978 | Carson | C02F 1/14 203/11 |
| 4,280,912 A | * | 7/1981 | Berry, III | B01J 47/04 210/195.1 |
| 5,405,503 A | * | 4/1995 | Simpson | B01D 3/065 203/10 |
| 5,443,739 A | * | 8/1995 | Vogel | B01D 61/08 210/652 |
| 5,925,223 A | * | 7/1999 | Simpson | B01D 3/065 203/11 |

(Continued)

*Primary Examiner* — Jonathan Miller
(74) *Attorney, Agent, or Firm* — Dunlap Bennett & Ludwig PLLC

(57) ABSTRACT

A power generating and water purifying system. The system includes a closed loop power generator, a closed loop heat exchanger, and a closed loop water purifier. Hot brine water vapor travels from a reactor to a turbine, which generates electricity. The hot brine water vapor is then cooled by the closed loop heat exchanger and travels back to the reactor. The electricity powers generators. The electricity further powers an ammonia pump and a coolant compressor of the closed loop heat exchanger. Dirty water enters through a water inlet and is chilled by the closed loop heat exchanger. The water is then directed to a hot water accumulator, in which the water is heated by the closed loop heat exchanger. The water is vaporized by a hot plate and a UV light source. The distilled water is then cooled in a cooling tower and delivered to water tower as purified water.

11 Claims, 4 Drawing Sheets

(56) References Cited

U.S. PATENT DOCUMENTS

| | | | | |
|---|---|---|---|---|
| 6,539,718 | B2* | 4/2003 | Bronicki | F03G 7/04 60/641.2 |
| 6,830,661 | B1* | 12/2004 | Land | B01D 1/0017 202/176 |
| 6,833,056 | B1* | 12/2004 | Kamiya | B01D 1/0047 202/155 |
| 6,919,000 | B2* | 7/2005 | Klausner | C02F 1/04 203/10 |
| 7,073,337 | B2* | 7/2006 | Mangin | B01D 3/007 60/783 |
| 8,623,174 | B1* | 1/2014 | Duesel, Jr. | B01D 1/14 159/16.1 |
| 9,644,500 | B2* | 5/2017 | Mu | B01D 1/0058 |
| 10,039,996 | B2* | 8/2018 | Frick | B01D 3/007 |
| 10,166,489 | B2* | 1/2019 | Frick | B01D 1/0047 |
| 2011/0147195 | A1* | 6/2011 | Shapiro | C02F 1/16 203/10 |
| 2014/0166211 | A1* | 6/2014 | Duesel, Jr. | B01D 1/14 159/46 |
| 2014/0298806 | A1* | 10/2014 | Jeter | F03G 7/04 60/641.2 |
| 2016/0258266 | A1* | 9/2016 | Frick | B01D 3/007 |
| 2016/0376933 | A1* | 12/2016 | Mu | B01D 1/0058 60/645 |

* cited by examiner

POWER GENERATING AND WATER PURIFYING SYSTEM

CROSS-REFERENCE TO RELATED APPLICATION

This application claims the benefit of priority of U.S. provisional application No. 62/653,314, filed Apr. 5, 2018, the contents of which are herein incorporated by reference.

BACKGROUND OF THE INVENTION

The present invention relates to water purification and power generation, and more specifically relates to a method of maximizing the efficiency of a power generation system (such as a nuclear reactor) while providing a mechanism by which water is purified of contaminants to be potable.

Presently, nuclear power accounts for a large portion of power generation in the first world. Unfortunately, few improvements have been made to the process of power generation from nuclear reactors since their inception. A large amount of power is lost to heat escaping to the cooling water. If this energy could also be captured, brine water could be super-cooled, and the efficiency of the reactor could be maximized.

Additionally, clean water is a necessity around the world, and is a requirement for prolonged manned space exploration. If the purification of water was a byproduct of power production, especially if accomplished via heat that is otherwise wasted via conventional power generation means such as nuclear, communities could have power as well as clean water via the same process and mechanism.

Similarly, in manned space missions, both power for the space craft as well as clean water for the crew are necessities for extended space travel. If there were a means by which power could be generated aboard a space craft, while simultaneously providing clean water for the crew, fewer challenges would exist to posit extended manned space missions.

Thus, there is a need for a new form of power generating apparatus and water purification system configured to maximize the efficiency of a conventional reactor which subsequently enables the purification of water as a result of the process. Such a system preferably only requires the boiling of water from byproduct heat of one or more power generation systems employing at least one of an assortment of fuels.

SUMMARY OF THE INVENTION

In one aspect of the present invention, a power generating and water purifying system comprising: a power generator comprising at least a turbine; and a heat exchanger comprising at least a refrigerant and a compressor, wherein steam is directed to the turbine of the power generator, thereby generating power, the power generator powers the compressor of the heat exchanger, and the heat exchanger boils water pumped from a water inlet, thereby purifying the water.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention is a power generating and water purification system configured to augment the power generation of a conventional nuclear reactor (or other power generation platform using a conventional fuel source), while simultaneously purifying the water used in the system. The present invention employs refrigerants, a hot water accumulator, at least one cooling mechanism in communication with the refrigerants, at least one ice block, a hot plate, and generators equipped with turbines in order to facilitate the purification of water, while maximizing the output of the power generation platform.

Per convention, a brine demister it is a component that slows the pressure of radioactive water down within a nuclear installation. The demister is the last bit of lost energy from the reactor which is not presently captured. The nuclear power plant allows the demister to slow the velocity of steam down before entering a heat exchanger. Within the heat exchanger, the brine water (heavy water) exchanges heat with ambient water or refrigerant to cool the nuclear core.

To change this within the industry, the system of the present invention posits the use of ammonia as a refrigerant to super-cool water reentering the nuclear core and control rods of the nuclear power plant. Therefore, with implementation of the system of the present invention, the core temperature would be considerably cooler (than presently found within nuclear plants) and most likely would consume less Uranium. What one must remember is the slight modifications to the demisters are vortex generators put in place of the useless need to expel or waste energy with demisters. Instead, the system of the present invention is configured to harness the energy by placing vortex generators to power gear plates within the distillery.

The present invention is a water purification and power generation system configured to employ convection and super-cooled substrates (namely ammonia) to achieve the desired result. The system employs UV light beams which are staged in sequence to boil remaining water to vapor, purifying the water, and allowing additional heat to be used for power generation. Preferably multiple generators are employed in the system, including a first phase generator, a second phase generator, and a third phase generator. An ammonia pump and an oxygen compressor/turbine are preferably in communication with the generators and are employed to circulate liquid oxygen and liquid ammonia as refrigerants for convection refrigeration in the system.

Figure 1:
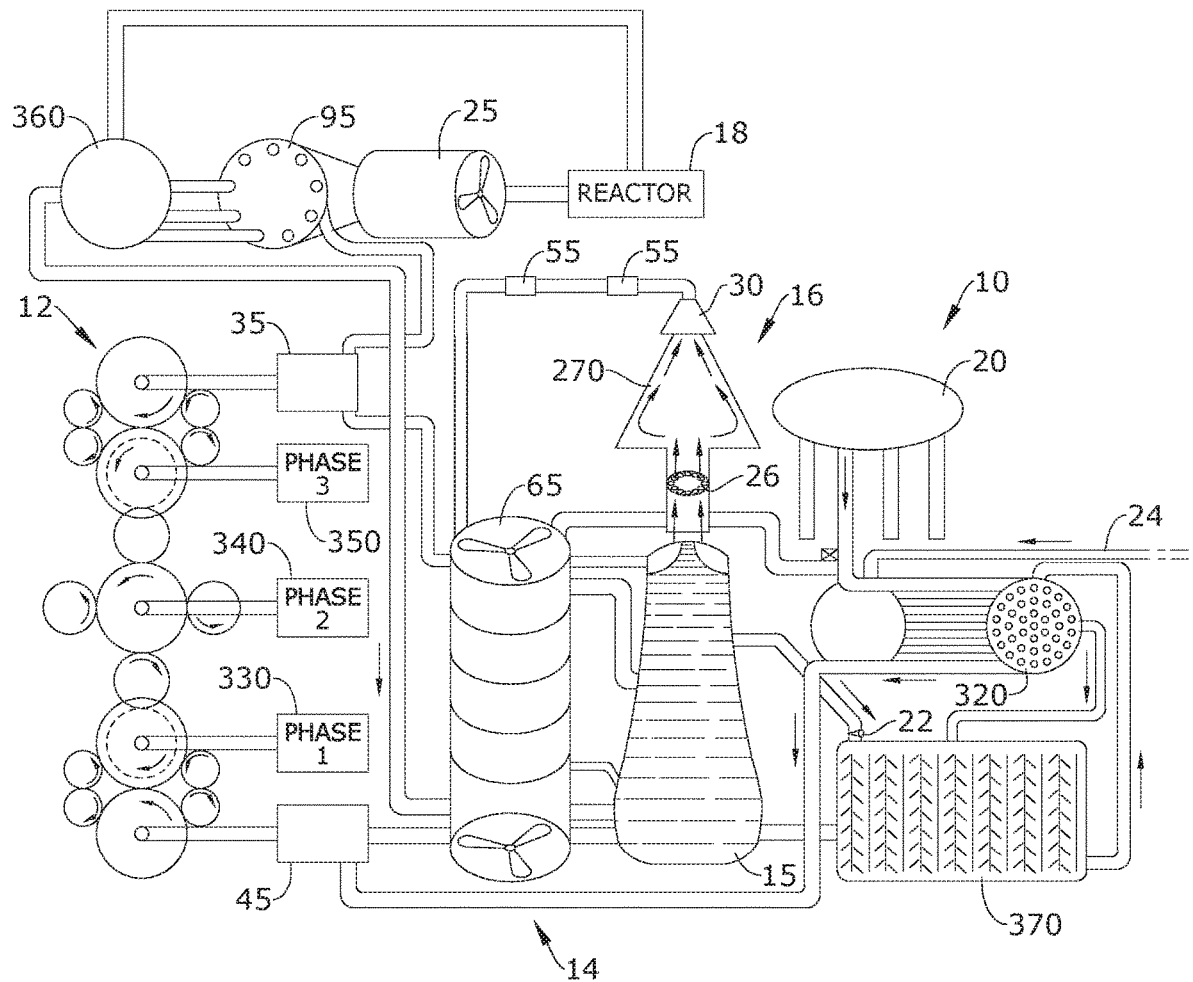
FIG. 1 is a schematic view of an embodiment of the present invention.

Referring to FIG. 1, the present invention includes a power generating and water purifying system 10. The system 10 includes a closed loop power generator 12, a closed loop heat exchanger 14, and a closed loop water purifier 16. Hot brine water vapor travels from a reactor 18 to a turbine 25, which generates electricity. The hot brine water vapor is then cooled by the closed loop heat exchanger 14 and travels back to the reactor 18. The electricity power generators 330, 340, 350. The electricity further powers an ammonia pump 35 and a coolant compressor 45 of the closed loop heat exchanger 14. Dirty water enters through a water inlet 24 and is filtered and chilled by the closed loop heat exchanger 14. The water is then directed to a hot water accumulator 15, in which the water is heated to a boil by the closed loop heat exchanger 14. The boiling water is then vaporized by a water vaporizer 60, 270. The water vapor, then rejects heat and cools and condenses in a cooling tower 65 and delivered to water tower 20 as purified water.

The closed loop power generator 12 is used to rotate a plurality of gear plates of the generators 330, 340, 350 and power the ammonia pump 35 and the compressor 45. In such embodiments, the hot brine water vapor travels from the reactor 18 to the turbine 25. From the turbine 25, the hot brine water vapor enters a spindle or inline generator 95, which generates electricity. The electricity runs to twelve motor windings that rotate gear plates attached to a phase 1 generator 330, a phase 2 generator 340 and a phase 3 generator 350. Each of the generators 330, 340, 350 rotate gear plates that interlock with gear plates of the ammonia pump 35 and the compressor 45. The ammonia pump 35 and the compressor 45 are thereby powered by the generators 330, 340, 350.

The closed loop heat exchanger 14 includes the ammonia pump 35, the compressor 45, the cooling tower 65, the hot water accumulator 15, the chiller barrel 320 and the ice block 370. A refrigerant, such as oxygen, 404a, and the like, is pumped from the compressor 45 as a hot gas to the hot water accumulator 15. The hot gas is then pumped to a condenser 22 and the subcooled liquid is sent to EVX (Electronic Explanation Valve) as a condensed liquid pumped through EXV to a cool evaporator in the ice block 370. The cool vapor runs through coils in the ice block 370 and then is directed to the chiller barrel 320. From the chiller barrel 320, the superheated (cool vapor or liquid oxygen) is pumped to the compressor to be compressed 45. The compressor 45 then converts the cool vapor or liquid oxygen to the hot gas oxygen to be sent to the hot water accumulator 15. The ammonia pump 35 pumps subcooled liquid ammonia to chiller barrel feed through another metering device, like an EXV, in which the cool ammonia cools the hot brine water vapor from the reactor 18. The ammonia is heated by the hot brine water and then pumped to the hot water accumulator 15. The hot ammonia is cooled by water and then is pumped through the cooling tower 65 and back to the ammonia pump 35 in the closed loop system to be delivered back to the chiller barrel 360.

The closed loop water purifier system 16 includes the water inlet 24, the water vaporizer 60, 270, vacuum pumps 55, and the water tower 20. The water vaporizer 60, 270 may include a hot plate 270, the UV light source 26, such as lasers, or a combination thereof. The water is provided from a dirty water source, such as a lake, a river, and the like. The dirty water is pumped through filters at the water inlet 24 and into the chiller barrel 320 to drop temperature from an ambient temperature to 40 degrees. The water then travels into the ice block 370 and is cooled to about 32 degrees. The water is then pumped from the ice block 370 to the hot water accumulator 15. The water is boiled within the hot water accumulator 15 by the hot saturated gas refrigerant and the supersaturated ammonium gas. The UV light source 26 and the hot plate 270 then vaporizes the boiling water. The UV light source 26 may provide light to solar panels 30, which powers vacuum pumps 55, creating a vortex 32, where high pressure meets low pressure. The water vapor is pumped by vacuum pumps 55 to the cooling tower 65, which condenses the water to a liquid state. The purified liquid water is then pumped to the water tower 20 or other water storage area to be delivered as fresh water.

Figure 2:
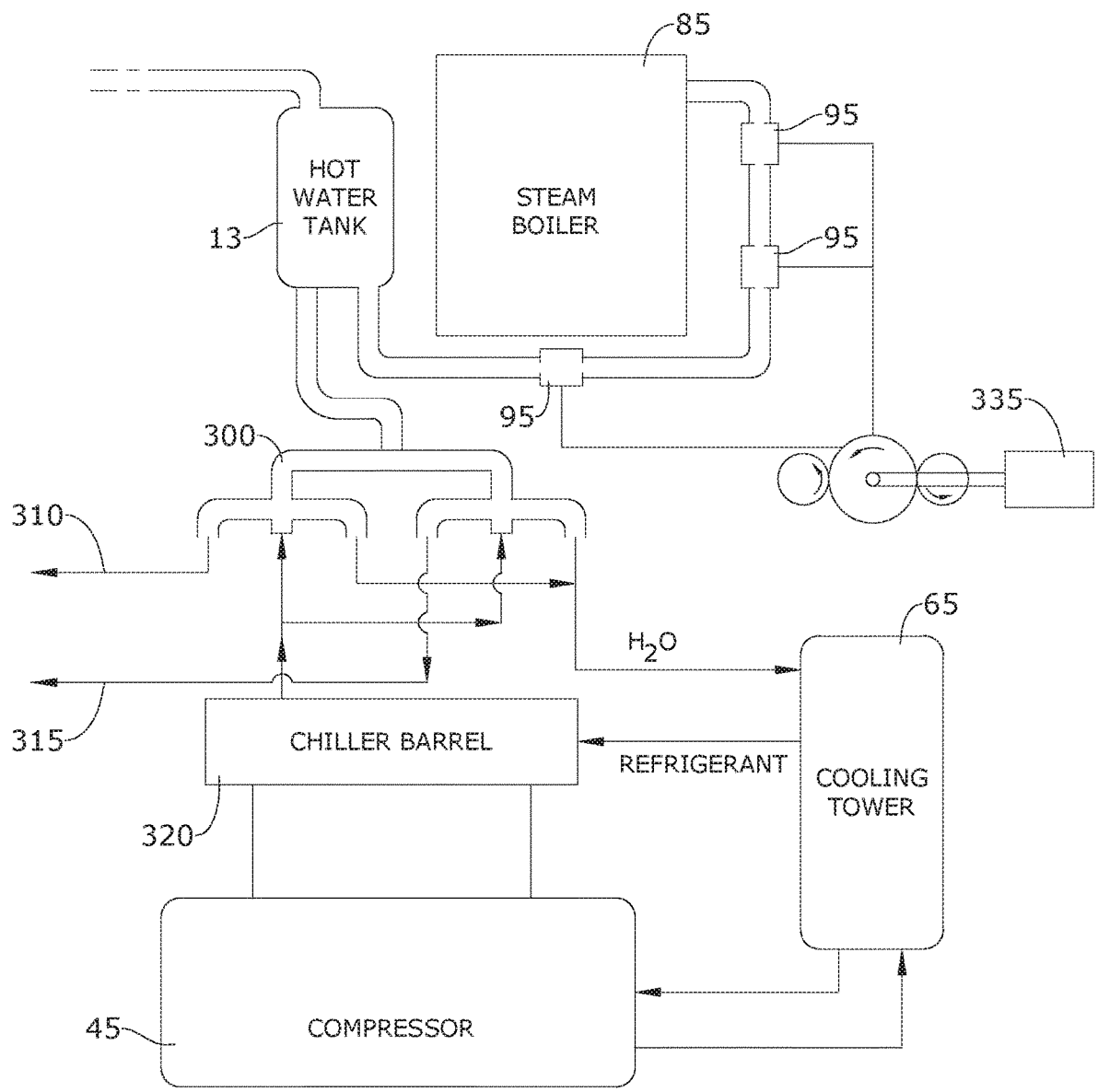
FIG. 2 is a schematic view of an embodiment of the present invention.

FIG. 2 illustrates a household system of the present invention. In such embodiments, the present invention includes a steam boiler 85, which produces steam. The steam travels through spindles or inline generators 95, which drives gear plates of a generator 335 and generates electricity. The water vapor then travels to hot water tank 13, in which the water is condensed and stored as hot water. The hot water may be directed into the household from the hot water tank 13 when the household needs to use hot water. Otherwise, the hot water is directed from the water tank 13 to the reversing valves 300.

The household system also includes a water chiller system. The water chiller system includes a compressor 45, a cooling tower to reject heat from distilled water from steam boiler 65 and a chiller barrel 320. The refrigerant circulates from the compressor 45 to the cooling tower to reject heat from refrigerant 65, from the cooling tower 65 to the chiller barrel 320 and from the chiller barrel 320 back to the compressor 45. The reversing valves 300 direct the water to the cooling tower 65 in which the water is cooled to an ambient temperature. The water is then pumped through the chiller barrel 320, which drops the water to about 40 degrees F. The water is then pumped through the reversing valves 300 and out of a first stage flow 310. Alternatively, the reversing valves 300 may be switched to direct the hot water from the hot water tank 13 directly to the second stage flow 315. The first stage flow 310 and the second stage flow 320 may direct the cold and hot water respectively to hydraulic coils that may be located in the attic of the household. The water is then either directed to a water storage or back to the closed loop system.

Figure 3:
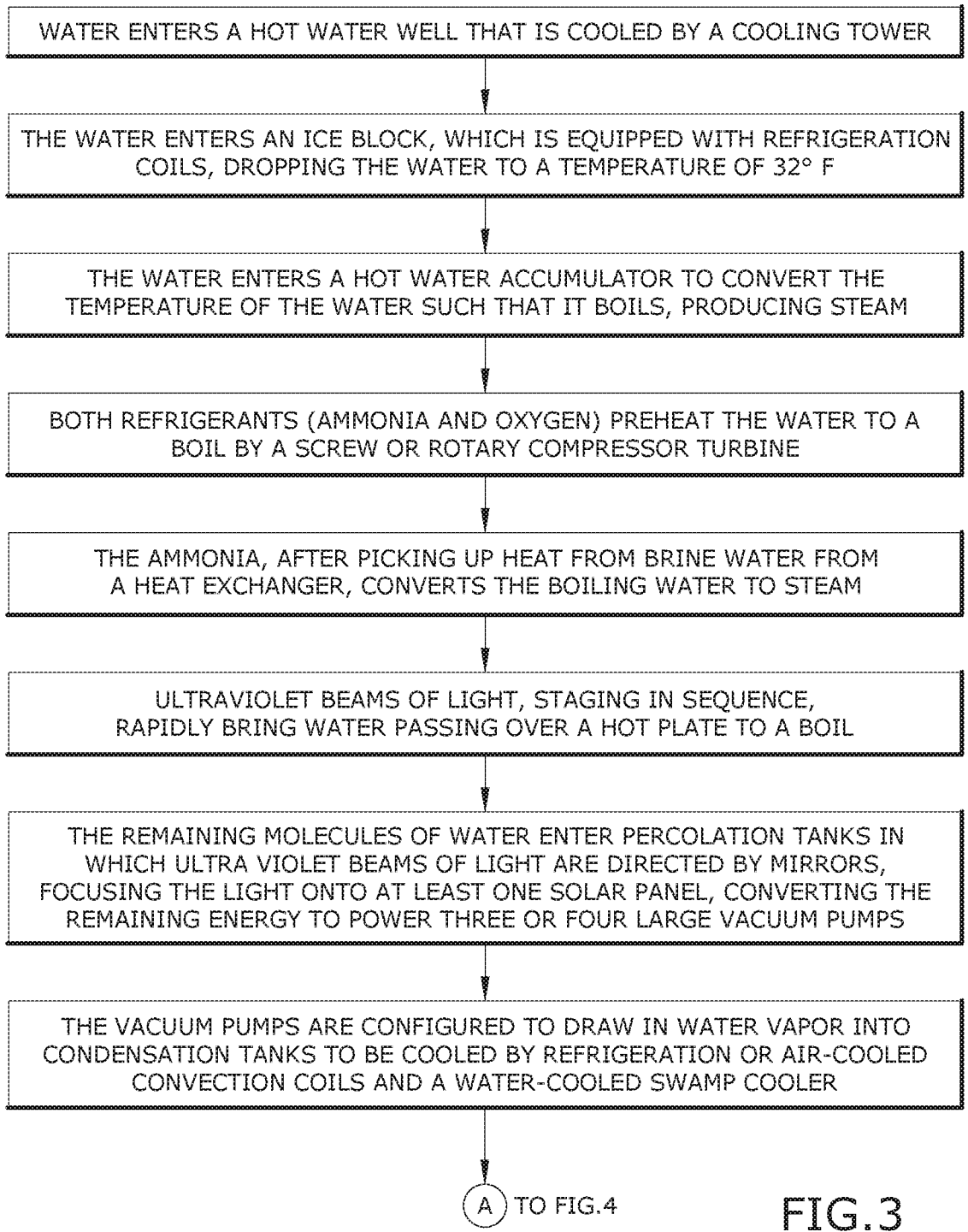
FIG. 3 is a flow chart of an embodiment of the present invention.
Figure 4:
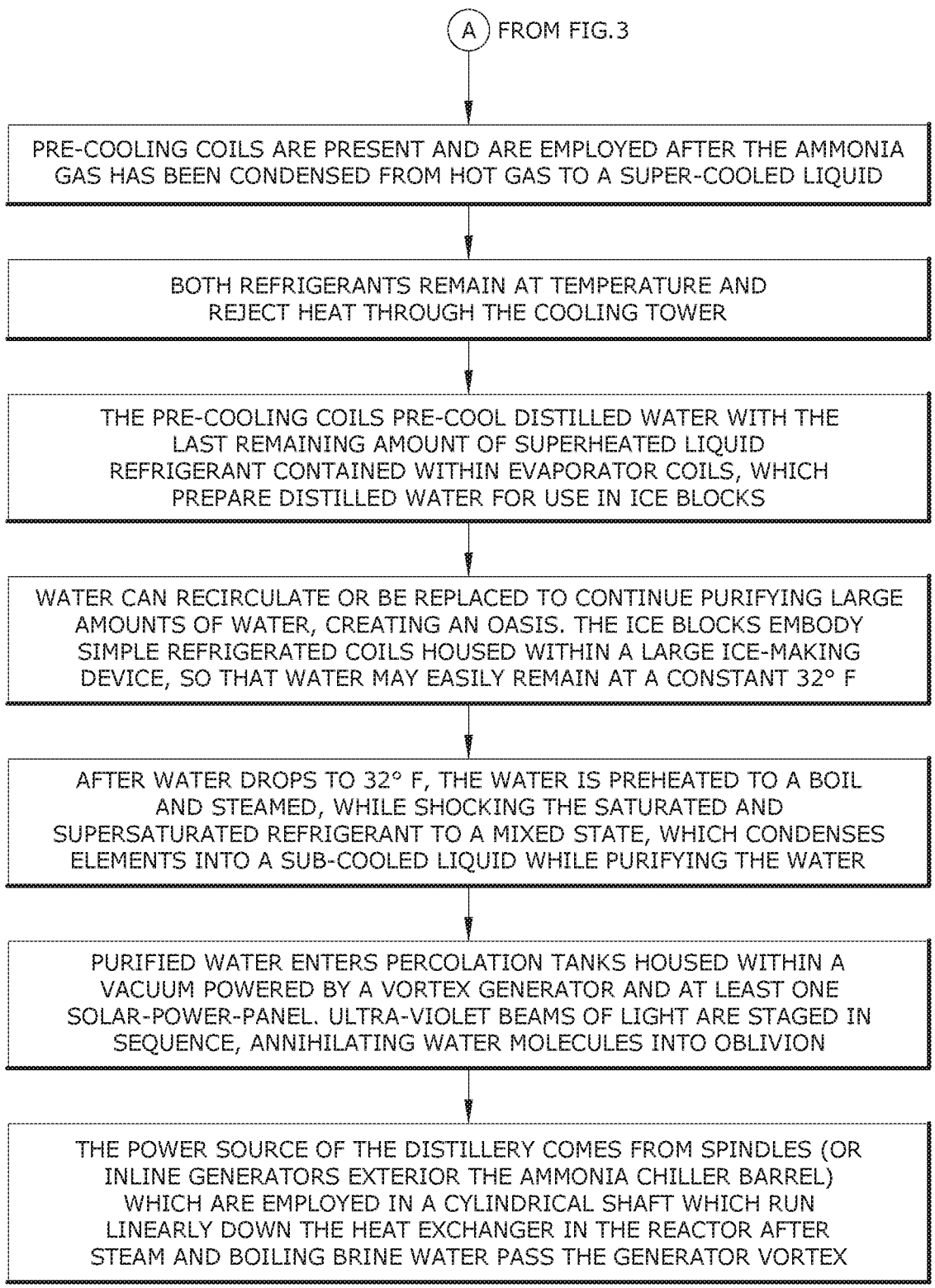
FIG. 4 is a continuation of the flow chart of FIG. 3.

Referring to FIGS. 3 and 4, first, water enters a hot water well that is cooled by a cooling tower. Then, the water enters an ice block which is equipped with refrigeration coils, dropping the water to a temperature of thirty-two degrees. The water then enters a hot water accumulator to convert the temperature of the water such that it boils, producing steam. Both refrigerants, (Ammonia and Oxygen) preheat the water to a boil by a screw or rotary compressor turbine. Then Ammonia, after picking up heat from brine water from a heat exchanger, converts the boiling water to steam. Via the system, the ammonia absorbs heat from the heat exchanger, and oxygen facilitates convection heating by mechanism of the compression and saturation of refrigerant molecules. In space craft installations of the system of the present invention, an electrical or mechanically-driven crank shaft is in communication with a gear plate to ensure a lightweight installation for use in space. Ammonia is a requirement of preferred embodiments of the present invention as the boiling water is radioactive. Therefore, the ammonia absorbs heat from the brine water, and super-cools brine water returning to the reactor core. Then, ultraviolet beams of light, staging in sequence, brings water passing over a hot plate to a boil rapidly. It should be noted that the beams of light (preferably lasers) may alternate in sequence or they will over heat. As such, multiple beams of light are employed, which are turned on and off in rotation in order to maintain the ideal constant temperature in order to boil water quickly. In some embodiments, the water may boil in a hot water accumulator, and then vaporize on the hot plate to expedite the process. The faster the process is executed;

the more chilled brine water is needed. The distillery also requires more fresh water to boil in such expedited embodiments. The remaining molecules of water then enter peculation tanks in which ultra violet beams of light are directed by mirrors focusing the light onto at least one solar panel converting the remaining energy to power three or four large vacuum pumps. The vacuum pumps are configured to draw in water vapor into condensation tanks (cooling tower) to be cooled by refrigeration or air-cooled convection coils and a water-cooled swamp cooler. Pre-cooling coils are present and are employed after ammonia gas has been condensed from hot gas to supercooled liquid. Both refrigerants (such as 404A) remain at temperature and reject heat through the cooling tower. Then, the pre-cooling coils pre-cools distilled water with the last remaining amount of superheated liquid refrigerant contained within evaporator coils, which prepare distilled water for use in ice blocks. As the cold evaporator gases are at a low pressure, they are very cold. The subcooled liquid refrigerant comes from the condenser after rejecting heat from the objective. Water can recirculate or be replaced to continue purifying large amounts of water, creating an oasis. The ice blocks embody simple refrigerated coils housed within a large ice-making device so that water may easily remain at a constant thirty-two degrees Fahrenheit. After water drops to thirty-two degrees Fahrenheit (zero degrees Celsius), the water is preheated to a boil and steamed, while shocking the saturated and supersaturated refrigerant to a mixed state, which condenses elements into a subcooled liquid while purifying the water. It is critical to note that oxygen is saturated, and ammonia is supersaturated, as oxygen can be flammable, and supersaturation is very hot. Therefore, it should be understood that there is a designation between the two refrigerants. Purified water enters peculation tanks (cooling tower) housed within a vacuum powered by vortex generator and at least one solar-power-panel. Ultra-violet beams of light are staged in sequence, annihilating water molecules into oblivion. It should be understood that the molecules are thereby separated to a degree that burns any and all contaminates by friction and vibrant molecular movement, micronizing molecules such that they are smaller until the contaminants are annihilated by and purified by heat. This is the end of the water cycle before exiting the distillery prior to leaving to be consumed. The power source of the distillery comes from spindles which are employed in a cylindrical shaft which run linearly down the heat exchanger in the reactor after steam and boiling brine water pass the generator vortex.

It should be understood, of course, that the foregoing relates to exemplary embodiments of the invention and that modifications may be made without departing from the spirit and scope of the invention as set forth in the following claims.

What is claimed is:

1. A power generating and water purifying system comprising:
   a power generator comprising at least a turbine;
   a heat exchanger comprising a cooling tower, a hot water accumulator, a chiller barrel, an ice block, at least a refrigerant and a compressor; and
   a water purifier comprising at least a water vaporizer, wherein
   steam is directed to the turbine of the power generator, thereby generating power,
   the power generator powers the compressor of the heat exchanger,
   the heat exchanger boils water pumped from a water inlet, and
   the water vaporizer vaporizes the boiling water, thereby purifying the water.

2. The power generating and water purifying system of claim 1, wherein the steam is hot brine water vapor from a nuclear reactor.

3. The power generating and water purifying system of claim 2, wherein the hot brine water vapor is cooled by the heat exchanger and pumped back to the reactor.

4. The power generating and water purifying system of claim 1, wherein the power generator further comprises a spindle or an inline generator that generates electricity from a flow of the steam.

5. The power generating and water purifying system of claim 1, wherein the heat exchanger further comprises an ammonia pump, wherein the power generator powers the ammonia pump and the compressor.

6. The power generating and water purifying system of claim 1, wherein the vaporizer of the water purifier comprises at least one of a hot plate and a UV light source.

7. The power generating and water purifying system of claim 6, wherein the water is pumped from the water inlet into the chiller barrel, the ice block, and into the hot water accumulator, wherein the water is boiled within the hot water accumulator by the refrigerant and ammonium.

8. The power generating and water purifying system of claim 7, wherein the boiling water is vaporized by the UV light and the hot plate.

9. The power generating and water purifying system of claim 8, wherein the UV light source provides light to solar panels, wherein the solar panels power a vacuum pump, wherein the vacuum pump pumps the vaporized water to the cooling tower, which condenses the purified water to a liquid state.

10. The power generating and water purifying system of claim 9, wherein the purified water in the liquid state is pumped from the cooling tower to a water tower for storage and distribution.

11. A power generating and water purifying system comprising:
    a power generator comprising at least a turbine; and
    a heat exchanger comprising a compressor, an ammonia pump, a cooling tower, a hot water accumulator, a chiller barrel, and an ice block, wherein
    steam is directed to the turbine of the power generator, thereby generating power,
    the power generator powers the compressor and the ammonia pump of the heat exchanger, and
    the heat exchanger boils water pumped from a water inlet, thereby purifying the water.

\* \* \* \* \*